M. PRAGER.
CONTINUOUS EVAPORATION.
APPLICATION FILED NOV. 22, 1912.

1,096,193.

Patented May 12, 1914.

WITNESSES
Frank H. Logan.
Alfred R. Anderson

INVENTOR
MORITZ PRAGER
BY H. van Lodenneel
ATTORNEY

UNITED STATES PATENT OFFICE.

MORITZ PRAGER, OF BERLIN, GERMANY.

CONTINUOUS EVAPORATION.

1,096,193. Specification of Letters Patent. Patented May 12, 1914.

Application filed November 22, 1912. Serial No. 732,998.

*To all whom it may concern:*

Be it known that I, MORITZ PRAGER, subject of the German Emperor, residing at Berlin, Germany, have invented a new and useful Continuous Evaporation; and I do hereby declare the following to be a full, clear, and exact description of the same.

The problem of concentrating, drying or crystallizing in stages materials that can be handled with a shovel, presented hitherto great difficulties in chemical industry, as there was no suitable device that worked in a continuous and completely automatic manner for concentrating, drying or crystallizing in separate stages.

This invention relates to an automatically and continuously working concentrating, drying and crystallizing device for any materials or substances that can be handled with a shovel, of simple construction and working, and easily adaptable to the various physical properties of the substances to be treated.

The new device chiefly consists of a casing subdivided in its lower portion, by means of partitions, into chambers connected in series, with a concentric stirring spindle carrying on one side stirring shovels for working the material arranged in the single chambers, and on the other side, that is, at an angle of 180° to the stirring shovels, scooping shovels or buckets for transporting the material sufficiently treated in one chamber, into the next one.

A construction according to this invention is illustrated by way of example in the accompanying drawing in which—

Figure 1:
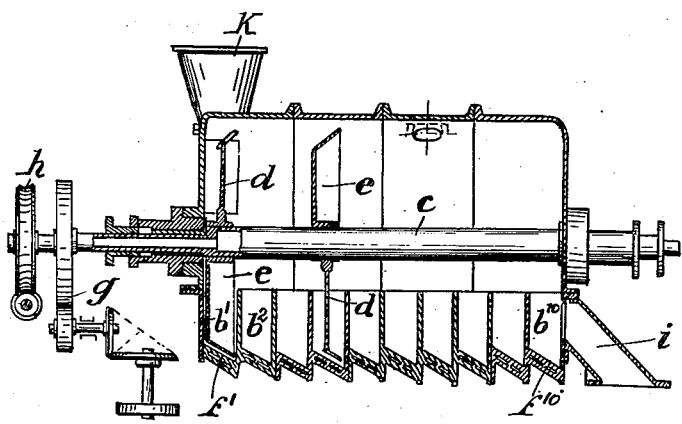
Figure 2:
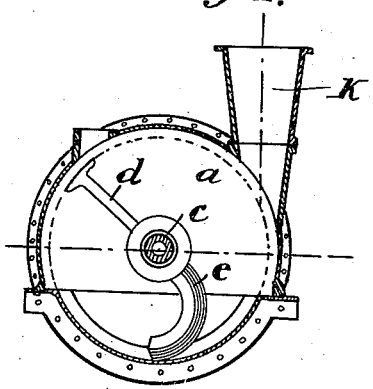

Figure 1 shows it in longitudinal section, and Fig. 2 in cross-section.

The device consists of a casing $a$ subdivided in its lower part, by means of transverse partitions, into single chambers $b^1-b^{10}$ connected in series. These chambers are preferably provided with oblique bottoms $f'-f^{10}$. Concentrically with the casing $a$ which has the shape for instance, of a cylindrical drum, is arranged a stirring spindle $c$ with a number of stirring blades $d$, equal to that of the chambers, only two of these blades being shown in Fig. 1, and a number of scooping blades $e$ one for each chamber, arranged at an angle of 180° to the stirring blades, of which also two are shown in the drawing. The spindle $c$ receives from the outside, by means of the gearing $g$, preferably a rocking motion, so that the spindle $c$ is rocked to and fro, the stirring blades $d$ being thus carried forward and backward through the material collected in the chambers $b^1-b^{10}$. The spindle is further provided with a periodically operated worm gear $h$ which, after the spindle $c$ has made a certain number of oscillations, turns it to an angle of 360°, so that the scooping blades $e$ pass through the chambers $b^1-b^{10}$ and convey the material contained in the chambers, into the next chamber, until the said material is finally discharged through the outlet branch $i$ of the device.

If it is for instance desired to dry moist material in such a device, the said material is introduced through the charging hopper $k$ into the first chamber of the apparatus, and the stirring arms $d$, owing to the rocking movement, bring the material to be dried, into a thorough contact with the heating surfaces. In the "angle" bottom of the first chamber, which in that case is formed into a heating surface, after a certain period of time, the spindle is rotated through 360°, whereby the material in the first chamber is conveyed into the second. New material then falls through the hopper $k$ into the first chamber, and so on, so that a continuous gradual drying of the material takes place in the single chambers. The driving of the spindle $c$ can be regulated to suit the degree of moisture of the material to be treated, so that the material is always left for a sufficient period of time in the single chambers through which it must pass during the drying process.

If it is desired to use the apparatus for crystallizing, the single chambers are preferably provided in parts of their periphery, with sieves, while the scooping blades are provided with corresponding holes. The solution lye is then introduced into the first chamber, the stirring spindle rocked until a separation of crystals is noticed. The stirring spindle is thereupon turned to 360°, and in that way the crystals formed, are carried by the scooping blades from one chamber to the next one, while the lye freed from the crystals flows through the scooping blades into the chamber and can be discharged from the latter. Fresh lye for enriching the crystals transferred from the first into the second chamber, can then be introduced into the second chamber, and so on. The growth of crystals can be at the same time accelerated or retarded, according as more or less concentrated solution is used in the chambers. The drying of the crystals formed, can be simultaneously carried out in the same apparatus, by forming the last chambers into the drying chambers.

The apparatus could be used in the same way for lixiviating materials in the form of grains or paste, by introducing the grains or the paste into the first chamber and treatting the same with a large quantity of liquid, water or lye, by subsequently transferring the residue into the next chamber (the stirring spindle being turned to 360°) and so on.

The apparatus could also be used for evaporating or concentrating lyes, which separate salts or other solid bodies, the first chamber of the apparatus being filled with a certain quantity of lye which is then concentrated, by heating the chamber, to such an extent that salt is separated, whereupon the salt thus produced is transferred by means of the scooping blade formed into a sieve, into the next chamber and so on.

Finally, it is obvious that the apparatus could be used with atmospheric pressure, as well as with a vacuum or under pressure.

Having fully described the nature of my invention and in what manner the same is to be performed, I declare that what I claim and desire to secure by Letters Patent is:—

1. In a device for treating substances capable of being shoveled, the combination with a casing having transverse partitions in its lower part, of a spindle rotating in said casing, stirring blades on said spindle adapted to rotate between said partitions, scooping blades on said spindle opposite said stirring blades, adapted when passed through the spaces between two partitions to transfer material lying in each space into the next succeeding space.

2. In a device for treating substances capable of being shoveled, the combination with a casing of transverse partitions in its lower part subdividing it into chambers, double-walled bottoms in said chambers inclined downward toward the discharge end of the casing, a spindle rotating in said casing and having stirring blades, scooping blades on said spindle arranged opposite the stirring blades and adapted when rotated in the chambers, to transfer material from each chamber into the next succeeding chamber.

In testimony whereof, I have signed my name to this specification in the presence of two subscribing witnesses.

MORITZ PRAGER.

Witnesses:
  HENRY HASPER,
  WOLDEMAR HAUPT.